Dec. 8, 1942.   G. M. KLEUCKER   2,304,413
REFRIGERATING APPARATUS
Filed June 12, 1939   2 Sheets-Sheet 1

INVENTOR
GEORGE M. KLEUCKER
BY
ATTORNEY

Dec. 8, 1942.   G. M. KLEUCKER   2,304,413
REFRIGERATING APPARATUS
Filed June 12, 1939   2 Sheets-Sheet 2

INVENTOR
GEORGE M. KLEUCKER
BY
ATTORNEY

Patented Dec. 8, 1942

2,304,413

UNITED STATES PATENT OFFICE 2,304,413

REFRIGERATING APPARATUS

George M. Kleucker, St. Louis, Mo., assignor, by mesne assignments, to William P. Gruner, St. Louis, Mo.

Application June 12, 1939, Serial No. 278,608

6 Claims. (Cl. 62—126)

This invention relates generally to refrigerating apparatus and, more particularly, to a certain new and useful improvement in refrigerating methods and apparatus of the type commonly now known as "quick freezing" particularly adapted for low temperature refrigeration.

My invention has for its primary objects the provision of refrigerating apparatus of the type stated which may be cheaply constructed, which is exceedingly economical in operation and maintenance, which is especially well suited to the production of relatively low temperatures, which is compact, rugged, and durable, and has relatively few moving parts, and which is highly efficient in the performance of its stated and intended functions.

My invention has for a further object the provision of a method of producing a refrigerating effect which is extremely efficient and economical.

And with the above and other objects in view, my invention resides in the novel features of form, construction, arrangement, and combination of parts presently described and pointed out in the claims.

In the accompanying drawings (2 sheets)—

Figure 1:
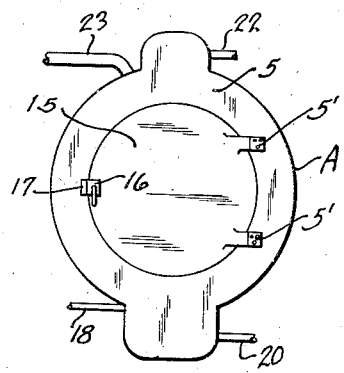
Figure 1 is an end elevational view of a refrigerating apparatus constructed in accordance with and embodying my present invention.

Referring now in more detail and by reference characters to the drawings, which illustrate practical embodiments of my present invention, the refrigerating apparatus includes a cooler A comprising an intermediate horizontally disposed cylindrical shell 1 provided preferably integrally along its upper peripheral surface with an axially or longitudinally extending dome-like channel or header 2 and along its lower peripheral surface, preferably in diametral juxta-position to the header 2, with an axially or longitudinally extending channel-shaped sump 3.

Welded or otherwise hermetically sealed to, and extending transversely across one end of, the shell 1, is a rear end wall 4, and similarly mounted across the opposite end of the shell 1, is a front end wall 5 having a concentric mouth-forming aperture 6.

Co-axially supported within the shell 1 by a plurality of axially spaced ring-shaped fins or supporting baffles 7 and at an end abuttingly welded or otherwise hermetically sealed against the end wall 4, is an inner cylindrical shell 8, which is approximately of the same diametral size as, and registers with, the aperture 6, the fins 7 being chordwise cut away across the upper portion of their periphery, as at 9, in the provision of an axially or longitudinally extending segmental gas passage 10.

Figure 3:
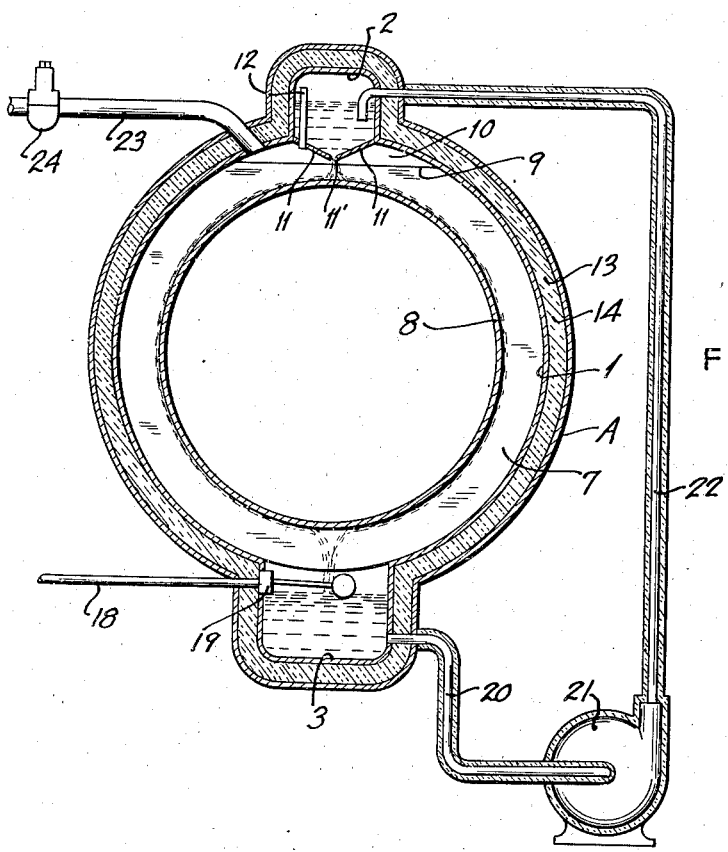
Figure 3 is an enlarged transverse sectional view of the apparatus, taken approximately along the line 3—3, Figure 2.

Welded or otherwise secured along the lower margins of the header 2, is a pair of inwardly and obliquely downwardly extending distributor-plates 11 spaced from each other at their opposed inner margins in the provision of an elongated discharge slot or opening 11', and mounted in and extending vertically through one of the plates 11 for communication at its opposite ends, respectively, with the gas space 10 and the free space of the header 2, is a vent tube 12, all as best seen in Figure 3 and for purposes presently fully appearing.

Figure 2:
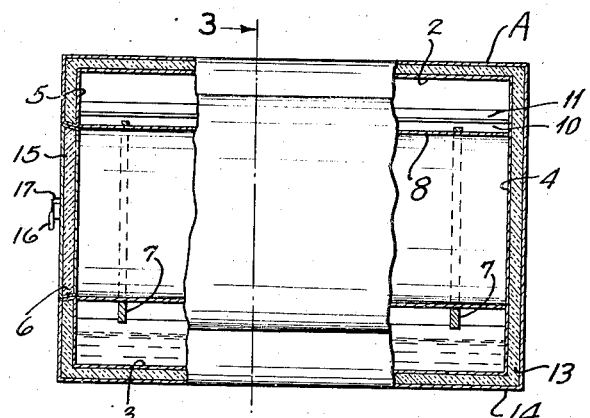
Figure 2 is a side elevational view, partly broken away and in section, of the apparatus.

Disposed around the entire outer periphery of the shell 1 and its associated end wall 4 and front wall 5, is a relatively thick layer 13 of insulating or non-conducting material, such as cork, rock wool, or the like, held in place by an outer over-all casing 14 constructed of sheet metal, heavy fabric, or other conventional insulation retaining material, all as best seen in Figures 2 and 3.

Hingedly mounted in any conventional manner, as at 5', upon the front wall 5, is an insulated disk-shaped door 15 adapted for tight hermetically sealed closure-forming engagement in the shell mouth or aperture 6 and provided with a suitable locking handle 16 for retentive engagement with a detent member or keeper 17 suitably mounted on the front wall 5, all as best seen in Figure 1 and for purposes presently fully appearing.

Extending through the casing 14, the insulating layer 13, and into the sump 3, is a high-pressure liquid line 18 communicating at its outer end with a conventional liquid receiver (not shown) and at its inner end with a conventional float control supply valve 19 set for maintaining a predetermined liquid level within the sump 3.

Likewise extending through the casing 14, the insulating layer 13, and opening into the sump 3, is a recirculation line 20 communicating at its outer end with the intake port of a conventional recirculating pump 21, in turn, connected at its discharge port for communication through a header supply line 22 with the header 2, as best seen in Figure 3. For a conventional pump on the outside, it is to be understood that an ejector or pump placed directly into the sump may be substituted and equally well employed.

Also extending through the casing 14, the insulating layer 13, and the shell 1 for communication at its inner end with the gas passage 10, is a suction line 23 having communicating connection at its outer end with the suction manifold of a conventional refrigerant compressor (not shown).

In use and operation, liquid refrigerant is delivered from the receiver through the supply line 18 and the float valve 19 to the sump 3 and is thence circulated through the recirculation line 20, the recirculating pump or the like 21, and the header supply line 22 to the header 2 and flows downwardly through the header discharge slot 11' over the outer surface of the inner shell 8 in a continuous and substantially uninterrupted sheet or film. As the liquid refrigerant enters the sump 3 through the float valve 19, a certain portion thereof is evaporated in the formation of flash gas, which is exhausted and returned to the compressor through the suction line 23 and a back-pressure valve 24.

It will, of course, be understood that the liquid refrigerant flowing into the sump 3 will be chilled to a predetermined temperature depending on the setting of the back-pressure control valve 24. The liquid refrigerant, which is thereupon circulated as described to the header 2, will be at correspondingly low temperature and, in flowing over the outer surface of the shell 8, will produce a primary cooling effect as a cold liquor. In addition, a certain amount of evaporation, due to the heat load picked up from inside, will take place in the body of the film flowing over the outer surface of the shell 8, but any gas bubbles which tend to form will be sheared off and ultimately discharged from the outer surface of the film into the free space between the inner shell 8 and the shell 1 for evacuation and return to the compressor through the suction line 23 and the back-pressure valve 24, so that the liquid refrigerant film will be maintained at low temperature, thereby producing an extremely efficient cooling effect upon the interior of the inner shell 8 and the meat, fruit, vegetables, ice-cream, or other material placed therein for freezing.

Figure 4:
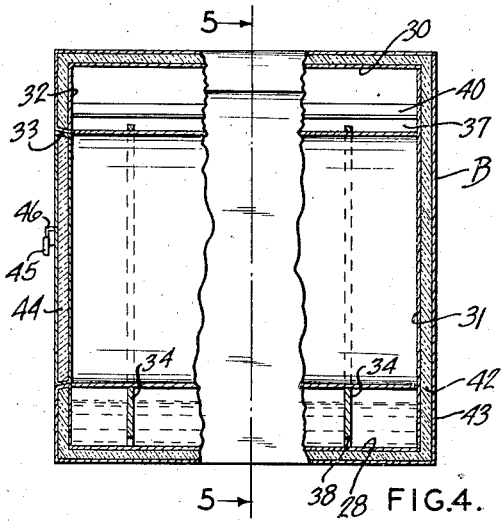
Figure 4 is a side elevational view, partly broken away and in section, of a slightly modified form of refrigerating apparatus embodying my present invention.
Figure 5:
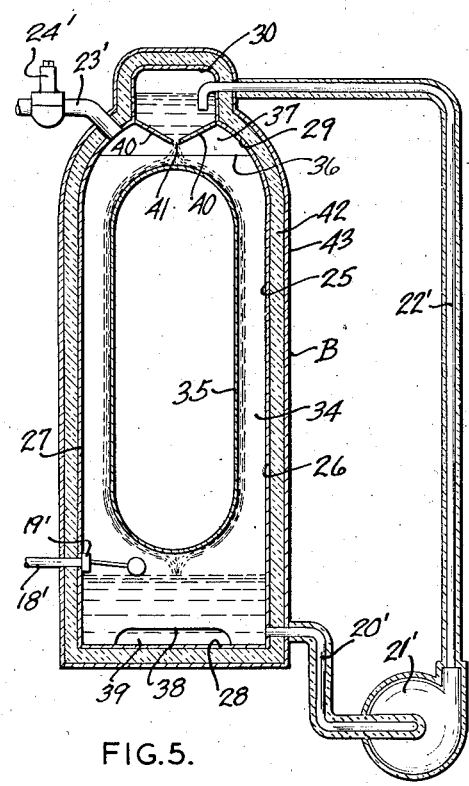
Figure 5 is an enlarged transverse sectional view of the modified apparatus of Figure 4, taken approximately along the line 5—5, Figure 4.

In the case of certain objects, it has been found desirable to provide a somewhat differently shaped cooler, such as the cooler B, Figures 4, 5, which cooler comprises an intermediate shell 25 having a pair of spaced parallel vertically disposed side walls 26, 27, a horizontally disposed bottom wall 28, and a dome-shaped top wall 29 centrally provided with an axially extending inverted channel-shaped header 30. Across its one end, the shell 25 is provided with a rear end wall 31 and across its other end with an annular front wall 32 centrally apertured in the provision of an opening or mouth 33 of preferably elongated oval shape.

Co-axially supported within the shell 25 by a plurality of spaced ring-shaped baffles or fins 34 and at an end abuttingly welded or otherwise hermetically sealed against the rear end wall 31, is an inner shell 35, which is approximately of the same size and shape as, and registers with, the aperture 33, the fins or supporting baffles 34 being horizontally cut away along their respective upper margins, as at 36, in the provision of a gas passage 37 and along their respective lower margins, as at 38, in the provision of a liquid passage 39.

Welded or otherwise secured along the lower margins of the side walls of the header 30, is a pair of inwardly and obliquely downwardly extending distributor plates 40 spaced from each other by a short distance along their inner longitudinal margins in the provision of an elongated discharge slot or opening 41, all as best seen in Figure 5 and for purposes presently fully appearing.

Disposed around the outer surface of the shell 25, is a continuous layer 42 of any suitable insulating material protected and held in place by a conventional outer casing 43, and hingedly mounted on the front wall 32 and sized for tight-fitting closure-forming engagement in the shell mouth 33, is an insulated door 44 provided with a suitable locking handle 45 for retentive engagement in a suitable detent or keeper 46 fixed upon the front wall 32.

The shell 25 is provided with a supply line 18', a float valve 19', a recirculating line 20', a recirculating pump 21', a header supply line 22', a suction line 23', and a back-pressure valve 24' substantially identical in all respects with the previously described cooler A, all as best seen in Figure 5. It will, of course, be understood in this connection that a conventional ejector may be employed instead of the pump 21'.

Figure 7:
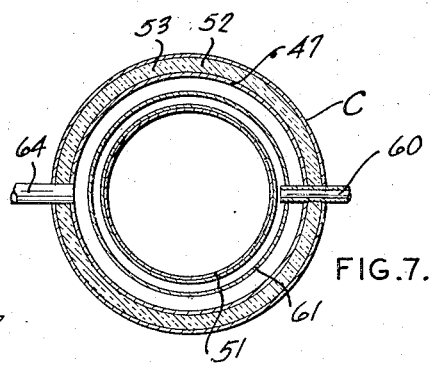
Figure 7 is a horizontal sectional view of the modified apparatus of Figure 6, taken approximately along the line 7—7, Figure 6.
Figure 6:
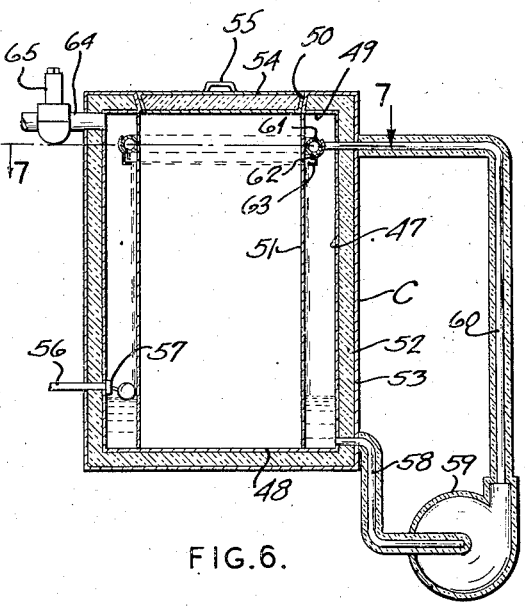
Figure 6 is a vertical sectional view of a second slightly modified form of refrigerating apparatus embodying my present invention.

As shown in Figures 6 and 7, a vertical or "pothole" type cooler C may also be employed, such cooler including a vertically disposed open-ended cylindrical outer shell 47 having a horizontal bottom wall 48 and a top wall 49 centrally apertured in the provision of a circular mouth or opening 50. Co-axially disposed within the outer shell 47 and welded or otherwise hermetically sealed upon the bottom wall 48, is an inner shell 51 diametrally sized for registration with, and being welded or otherwise sealed at its upper end to the margin of, the shell mouth 50. Disposed around the outer surface of the shell 47 and over the bottom wall 48 and top wall 49, is a relatively thick layer 52 of suitable insulating material conventionally held in place by an outer casing 53. Provided for snug-fitting removable disposition within the shell mouth or opening 50, is a thick insulated disk-shaped closure member or cover 54 centrally provided with a conventional handle 55, all as best seen in Figures 6 and 7.

Extending through the casing 53, the insulating layer 52, and into the shell 47, is a liquid refrigerant supply line 56 communicating at its outer end with a conventional high-pressure liquid receiver (not shown) and provided at its inner end with a float-controlled valve 57 for maintaining a constant level of liquid refrigerant in the bottom of the shell 47. Also extending through the casing 53, the insulating layer 52, and communicating with the shell 47 adjacent the lowest point thereof, is a recirculating line 58, which communicates at its outer end with the intake port of a recirculating pump or the like 59.

At its discharge port, the pump 59 is connected with a header supply line 60 extending through the casing 53, the insulating layer 52, and the upper end of the shell 47 for communication with an annular header pipe 61 having a plurality of radially downwardly extending discharge tubes 62 and an annular distributing flange or lip 63 of the type more particularly described in my co-pending application Serial No. 263,865, filed March 24, 1939.

Also extending through the casing 53, the insulating layer 52, and opening into the shell 47 adjacent the upper end thereof, is a suction line 64 having communication at its outer end through a conventional back-pressure control valve 65 with the suction manifold (not shown) of any conventional type of refrigerating system.

In use and operation, the liquid refrigerant, entering the casing 47 through the float valve 57, is partially evaporated and cooled and is thereupon circulated to the header 61 and cascaded downwardly in the form of a copiously flowing substantially uninterrupted film, producing a highly efficient cooling effect in the same manner as previously described.

The apparatus answers and fulfills the objects stated, and it is understood that changes and modifications in the form, construction, arrangement, and combination of the several parts of the apparatus may be made and substituted for those herein shown and described without departing from the nature and principle of my invention.

Having thus described my invention, what I claim and desire to secure by Letters Patent is:

1. A cooler comprising an inner shell, an outer shell disposed embracingly about and spaced from the inner shell, end walls secured respectively to and extending between adjacent end margins of said shells for closing the space therebetween, said outer shell having a header-forming channel provided with an apertured discharge wall, said outer shell being also provided with a sump-providing channel positioned substantially opposite to the header-forming channel, recirculating means connected at one end to the sump and at the other end to the header, means for supplying liquid refrigerant to the sump, and means opening to the space intermediate the shells for maintaining a predetermined back-pressure therein.

2. A cooler comprising an inner shell, an outer shell disposed embracingly about and spaced from the inner shell, end walls secured respectively to and extending between adjacent end margins of said shells for closing the space therebetween, said outer shell being formed with an outwardly extending header-providing channel having a slotted wall, said outer shell being also provided with an outwardly extending sump-providing trough positioned substantially opposite to the header-forming channel, recirculating means connected at one end to the trough and at the other end to the channel, means for supplying liquid refrigerant to the trough, and means opening to the space intermediate the shells for maintaining a predetermined back-pressure therein.

3. A cooler comprising an inner shell, an outer shell disposed embracingly about and spaced from the inner shell, end walls secured respectively to and extending between adjacent end margins of said shells for closing the space therebetween, said outer shell being formed with an upwardly extending header-providing channel having an apertured discharge wall, said outer shell being also provided with a downwardly extending sump-providing trough, recirculating means connected at one end to the trough and at the other end to the channel, means for supplying liquid refrigerant in sufficient quantity to maintain a substantially constant level in the trough, and means opening to the space intermediate the shells for maintaining a predetermined back-pressure therein.

4. A cooler comprising an inner cylindrical shell, an outer cylindrical shell disposed embracingly about and spaced from the inner shell, end walls secured respectively to and extending between adjacent end margins of said shells for closing the space therebetween in the provision of an annular evaporator space, said outer shell being deformed outwardly in the provision of axially extending channels arranged respectively on opposite sides of the shell and in substantially vertical alignment with each other to provide a header and a sump, a wall member mounted in and extending across the bottom portion of the header and apertured for communication with the evaporator space, recirculating means connected at one end to the sump and at the other end to the header, means for supplying liquid refrigerant in sufficient quantity to maintain a substantially constant level in the sump, and means opening to the space intermediate the shells for maintaining a predetermined back-pressure therein.

5. A cooler comprising an inner shell, an outer shell disposed embracingly about the inner shell, ring-shaped fins disposed between and connecting said inner and outer shells, a distributing header formed in the top wall of the outer shell, and means operatively associated with the outer shell for continuously recirculating liquid refrigerant from the bottom of said outer shell to the distributing header.

6. A cooler comprising an inner shell, an outer shell disposed embracingly about and spaced from the inner shell, end walls secured respectively to and extending between adjacent end margins of said shells for enclosing the space therebetween, said outer shell having a header-forming channel provided with an apertured discharge wall, said outer shell being also provided with a sump-providing channel arranged oppositely to the header-forming channel, recirculating means connected at one end to the sump and at the other end to the header, means for supplying liquid refrigerant to the sump, means opening to the space intermediate the shells for maintaining a predetermined back-pressure therein, and a tube extending through the discharge wall opening at its lower end to the space between the inner and outer shells and at its other end opening to the upper portion of the header-forming channel.

GEORGE M. KLEUCKER.